United States Patent [19]

Odani et al.

[11] Patent Number: 4,950,328

[45] Date of Patent: Aug. 21, 1990

[54] END MILL FORMED OF TUNGSTEN CARBIDE-BASE SINTERED HARD ALLOY

[75] Inventors: Niro Odani; Katsuhisa Yamamoto; Hitoshi Mayumi, all of Tokyo, Japan

[73] Assignee: Mitsubishi Metal Corporation, Tokyo, Japan

[21] Appl. No.: 376,402

[22] Filed: Jul. 6, 1989

[30] Foreign Application Priority Data

Jul. 12, 1988 [JP] Japan ................................ 63-173467

[51] Int. Cl.$^5$ ............................................. C22C 29/08
[52] U.S. Cl. ...................................... 75/240; 75/242; 419/18
[58] Field of Search ...................... 75/240, 242; 419/18

[56] References Cited

U.S. PATENT DOCUMENTS

| | | | |
|---|---|---|---|
| 3,677,722 | 7/1972 | Rymans ................................ | 75/240 |
| 3,816,081 | 6/1974 | Hale .................................... | 75/240 |
| 3,964,878 | 6/1976 | Scheithauer et al. ................. | 75/236 |
| 3,993,446 | 11/1976 | Okawa ................................ | 75/240 |
| 4,339,272 | 7/1982 | Grover et al. ........................ | 75/240 |
| 4,432,794 | 2/1984 | Holleck ................................ | 75/239 |
| 4,497,660 | 2/1985 | Lindholm ............................ | 75/240 |
| 4,828,584 | 5/1989 | Cutler .................................. | 75/240 |

Primary Examiner—Stephen J. Lechert, Jr.
Assistant Examiner—Leon Nigohosian
Attorney, Agent, or Firm—Frishauf, Holtz, Goodman & Woodward

[57] ABSTRACT

An end mill formed of a tungsten carbide-base sintered hard alloy comprising a binder phase including a Co-base alloy, and a hard disperse phase consisting essentially of WC in proportions of:
binder phase: 6–23 wt. %, and
hard disperse phase: 77–94 wt %,
the binder phase having a composition of:
Cr: 1–15 wt. %,
W: not more than 5 wt. %, and
the balance of Co and inevitable impurities, the hard disperse phase having a mean grain size of 0.5–2 µm.

3 Claims, No Drawings

END MILL FORMED OF TUNGSTEN CARBIDE-BASE SINTERED HARD ALLOY

BACKGROUND OF THE INVENTION

This invention relates to an end mill formed of a tungsten carbide (hereinafter simply referred to as "WC")-base sintered hard alloy having high strength and high toughness, as well as excellent wear resistance.

Conventionally, an end mill as a cutting tool is widely known, which is formed of a WC-base sintered hard alloY, and the WC-base sintered hard alloy comprises a binder phase including a Co-base alloy, and a hard disperse phase consisting essentially of WC in the following proportions:
binder phase: 10.5–16.5% (hereinafter percentages are weight percentages throughout the specification), and
hard disperse phase: 83.5–89.5%.

The binder phase has a composition of 2.5–11.6% of vanadium (V), and the balance of Co and inevitable impurities. As the starting material for V, which forms a solid solution in the binder phase, is used a powder of vanadium carbide (hereinafter simply referred to as "VC"), which is mixed with the other starting materials. During sintering, VC is decomposed and the vanadium component is dissolved into the binder phase to form a solid solution therein, which acts to suppress the growth of WC particles dispersed therein rather reduce the size thereof into a mean grain size equal to or smaller than 0.5 μm to thereby enhance the hardness and hence improve the wear resistance.

Although in the conventional end mill formed of the above-described WC-base sintered hard alloy, the WC-base sintered hard alloy has enhanced hardness and hence improved wear resistance due to the fine WC particles, its toughness is lowered accordingly. Therefore, if the end mill is used for cutting very hard materials or cutting by high-speed feeding, it is liable to break or be chipped at a cutting edge thereof due to insufficient toughness and strength, and hence it has a rather short life.

SUMMARY OF THE INVENTION

It is the object of the invention to provide an end mill formed of a WC-base sintered hard alloy having high hardness and high strength, as well as excellent wear resistance.

To attain the object, the present invention provides an end mill formed of a tungsten carbide-base sintered hard alloy comprising a binder phase including a Co-base alloy, and a hard disperse phase consisting essentially of WC in proportions of:
binder phase: 6–23%, and
hard disperse phase: 77–94%
the binder phase having a composition of:
Cr: 1–5%,
W: not more than 5%, and
the balance of Co and inevitable impurities, the hard disperse phase having a mean grain size of 0.5–2 μm.

Preferably, the tungsten carbide-base sintered hard alloy comprises the binder phase and the hard disperse phase in proportions of:
binder phase: 8–12%, and
hard disperse phase: 88–92%.

Further preferably, the binder phase contains 5–10% Cr.

Preferably, the binder phase contains not more than 3% W.

The above and other objects, features, and advantages of the present invention will become more apparent from the ensuing detailed description.

DETAILED DESCRIPTION

Under the aforestated circumstances, the present applicants have made many studies in order to develop an end mill formed of a WC-base sintered hard alloy having high hardness and high strength, as well as excellent wear resistance. As a result, the applicants have reached the following findings:

If an end mill is formed of a WC-base sintered hard alloy comprising a binder phase including a Co-base alloy, and a hard disperse phase consisting essentially of WC in the proportions of:
binder phase: 6–23%, and
hard disperse phase: 77–94%,
the binder phase having a composition of:
Cr: 1–15%,
W: not more than 5%, and
the balance of Co and inevitable impurities, wherein as the starting material for the Cr is used chromium carbide (hereinafter simply referred to as "$Cr_3C_2$"), chromium nitride (hereinafter simply referred to as "CrN"), or chromium oxide (hereinafter simply referred to as "$Cr_2O_3$"), which is mixed with the other starting materials, the end mill shows not only high hardness and high strength but also satisfactory toughness for the following reason: $Cr_3C_2$, CrN, or $Cr_2O_3$ is decomposed during sintering with the result that the resulting Cr is dissolved into the binder phase to form a solid solution therein, which acts to suppress the abnormal or excessive growth of WC particles dispersed therein to such a degree as to make the mean size of WC particles within a range of 0.5–2μm, and high toughness is secured due to this relatively coarse particle size of WC as compared with the conventional particle size of WC which is made fine by V. Further, the Cr also acts to suppress dissolution of W into the binder phase to limit the content of W dissolved in the binder phase after sintering to 5% or smaller to thereby prevent lowering in toughness which would otherwise be caused by excessive dissolution of W in the binder phase. Therefore, the end mill formed of the WC-base sintered hard alloy is free from breakage or chipping of the cutting edge thereof, and also has almost as high hardness as that of the conventional end mill formed of the conventional WC-base sintered hard alloy referred to before, hence exhibiting excellent cutting performance over a long period of time.

The present invention is based upon the above findings.

The end mill formed of a WC-base sintered hard alloy according to the invention has the aforementioned composition.

The end mill according to the invention has the aforestated conditions provided for the following reasons:

(a) Proportions of the binder phase and the hard disperse phase.

If the ratio of the binder phase is below 6%, the ratio of WC, which forms the hard disperse phase, can exceed 94%, which is such a large proportion as to lower the toughness of the WC-base sintered hard alloy. On the other hand, if the ratio of the binder phase is above 23%, the ratio of WC can become lower than 77%, which is such a small proportion as to lower the wear resistance of the alloy. Therefore, the respective proportions of the binder phase and the hard disperse phase are determined as: binder phase: 6-23%; and hard disperse phase: 77-94%. Preferably, the binder phase: 8-12%, and the hard disperse phase: 88-92%.

(b) Cr and W Contents in the binder phase

As described above, Cr is incorporated into the binder phase in the form of a solid solution during sintering through decomposition of $Cr_3C_2$, CrN, or $Cr_2O_3$ powder as a starting material powder. The dissolved Cr acts to suppress the abnormal or excessive growth of particles of WC to hold its mean grain size within a range of 0.5-2 μm to thereby secure sufficient wear resistance, and further suppress dissolution of W into the binder phase to limit the content of W dissolved in the binder phase to or below 5% to thereby prevent lowering in the toughness of the binder phase. However, if the Cr content in the binder phase is lower than 1%, the above-described effects cannot be obtained, while if the Cr content is above 15%, an abnormal phase can be produced in the alloy to thereby lower its toughness to a great degree. Therefore, the Cr content in the binder phase is determined as 1-15%. Preferably, the Cr content is 5-to %, and the W content is below 3%.

Examples of the end mill made of WC-base sintered hard alloy according to the invention will now be described in detail.

EXAMPLE

As starting powders, powder of WC, powder of $Cr_3C_2$, CrN, or $Cr_2O_3$, and powder of VC, each having a mean grain size of 0.5-2 μm, and powder of Co having a mean grain size of 1.3 μm were prepared. These starting powders were mixed in a wet-type ball mill for 72 hours, then dried, and compressed into green compacts having compositions shown in Table 1. The green compacts were sintered in a vacuum atmosphere at a predetermined temperature within a range of 1320°-1450° C., and the sintered compact was finish ground. Thus, there were prepared solid end mills formed of the WC-base sintered hard alloy according to the invention (hereinafter referred to as "the end mill according to the invention") Nos. 1 to 21 and conventional solid end mills formed of the conventional WC-base sintered hard alloy (hereinafter referred to as "the conventional end mill") Nos. 1 to 5, each being a two-flute type having a size of 6 mm in outer diameter and 50 mm in length, a helix angle of 45°, and a composition shown in Table 1 (the compositions of the binder phase were determined by the wet quantitative analysis method).

Then, the grain size of WC, and Rockwell hardness (A scale) of the thus prepared end mills were measured (the grain size of WC was measured by means of a scanning electron microscope). Further, deflective strength thereof was measured to evaluate toughness and strength. The end mills were also subjected to a test of cutting very hard steel under the following conditions:

Material to be machined:
SKD61 [AISI H13] (hardness: $H_R$ C61)
Cutting speed: 30 m/min
Feed: 0.02 mm/tooth
Depth of cut: 6 mm The cutting length of the steel was measured when the width of wear in the peripheral cutting edge reached 0.4 mm. The results of the measurements are shown in Table 1.

TABLE 1

| SPECIMEN | COMPOSITION OF GREEN COMPACT (WT. %) | | | | | | COMPOSITION OF WC-BASE SINTERED HARD ALLOY (WT. %) | | | | | | PROPERTIES OF WC-BASE SINTERED HARD ALLOY | | | |
|---|---|---|---|---|---|---|---|---|---|---|---|---|---|---|---|---|
| | | | | | | | COMPOSITION (WT. %) | | | Co + IM- PURI- TIES | BIN- DER PHASE | WC | WC MEAN GRAIN SIZE (μm) | TRANS- VERSE RUP- TURE (kg/mm²) | HARD- NESS ($H_R$ A) | CUT- TING LENGTH (m) |
| | Co | $Cr_3C_2$ | CrN | $Cr_2O_3$ | VC | WC | Cr | V | W | | | | | | | |
| END MILLS ACCORDING TO THE INVENTION | | | | | | | | | | | | | | | | |
| 1 | 6 | 0.1 | — | — | — | bal. | 1.5 | — | 4.6 | bal. | 6.4 | bal. | 2.0 | 345 | 91.5 | 15 |
| 2 | 6 | 0.4 | — | — | — | bal. | 6.2 | — | 1.0 | bal. | 6.5 | bal. | 1.5 | 353 | 92.0 | 18 |
| 3 | 8 | 0.3 | — | — | — | bal. | 3.3 | — | 3.5 | bal. | 8.6 | bal. | 1.2 | 370 | 91.7 | 19 |
| 4 | 8 | 0.6 | — | — | — | bal. | 7.0 | — | 1.3 | bal. | 8.7 | bal. | 0.9 | 382 | 92.1 | 23 |
| 5 | 10 | 0.75 | — | — | — | bal. | 7.0 | — | 1.5 | bal. | 10.9 | bal. | 1.0 | 425 | 91.6 | 27 |
| 6 | 10 | 1.0 | — | — | — | bal. | 8.7 | — | 0.3 | bal. | 11.0 | bal. | 0.8 | 390 | 92.0 | 26 |
| 7 | 12 | 0.7 | — | — | — | bal. | 5.1 | — | 1.5 | bal. | 12.8 | bal. | 0.9 | 402 | 91.2 | 23 |
| 8 | 12 | 1.0 | — | — | — | bal. | 7.3 | — | 0.7 | bal. | 13.0 | bal. | 0.7 | 418 | 91.5 | 24 |
| 9 | 14 | 1.0 | — | — | — | bal. | 6.2 | — | 1.2 | bal. | 15.1 | bal. | 0.9 | 415 | 91.1 | 20 |
| 10 | 16 | 1.5 | — | — | — | bal. | 8.6 | — | 0.1 | bal. | 17.5 | bal. | 0.8 | 432 | 90.5 | 16 |
| 11 | 20 | 2.0 | — | — | — | bal. | 10.5 | — | 0.1 | bal. | 22.4 | bal. | 0.6 | 454 | 90.4 | 14 |
| 12 | 6 | — | 0.4 | — | — | bal. | 5.0 | — | 1.5 | bal. | 6.4 | bal. | 1.4 | 344 | 91.9 | 18 |
| 13 | 6 | — | — | 0.5 | — | bal. | 5.4 | — | 1.3 | bal. | 6.4 | bal. | 1.4 | 335 | 91.9 | 17 |
| 14 | 8 | — | 0.7 | — | — | bal. | 6.5 | — | 1.7 | bal. | 8.7 | bal. | 0.8 | 385 | 92.2 | 22 |
| 15 | 8 | — | — | 0.6 | — | bal. | 4.9 | — | 2.3 | bal. | 8.6 | bal. | 0.9 | 360 | 92.1 | 23 |
| 16 | 10 | — | 0.9 | — | — | bal. | 6.6 | — | 1.8 | bal. | 10.9 | bal. | 0.9 | 415 | 91.8 | 25 |
| 17 | 10 | — | — | 0.8 | — | bal. | 5.2 | — | 2.1 | bal. | 10.8 | bal. | 0.9 | 411 | 91.7 | 25 |
| 18 | 12 | — | 1.1 | — | — | bal. | 6.7 | — | 1.0 | bal. | 13.0 | bal. | 0.7 | 415 | 91.5 | 23 |
| 19 | 12 | — | — | 1.0 | — | bal. | 5.4 | — | 1.5 | bal. | 12.9 | bal. | 0.8 | 408 | 91.3 | 22 |
| 20 | 14 | — | 1.2 | — | — | bal. | 6.3 | — | 1.2 | bal. | 15.1 | bal. | 0.9 | 413 | 91.1 | 20 |
| 21 | 14 | — | — | 1.0 | — | bal. | 4.6 | — | 2.7 | bal. | 15.1 | bal. | 1.0 | 402 | 90.9 | 18 |
| CONVENTIONAL END MILLS | | | | | | | | | | | | | | | | |
| 1 | 10 | — | — | — | 0.5 | bal. | — | 4.0 | 8.0 | bal. | 11.4 | bal. | 0.4 | 272 | 92.5 | 7 (chipped) |
| 2 | 12 | — | — | — | 0.5 | bal. | — | 3.4 | 11.0 | bal. | 14.0 | bal. | 0.4 | 299 | 92.0 | 5 (chipped) |
| 3 | 12 | — | — | — | 1.0 | bal. | — | 6.7 | 6.0 | bal. | 13.7 | bal. | 0.2 | 287 | 92.2 | 9 (chipped) |
| 4 | 14 | — | — | — | 0.5 | bal. | — | 2.9 | 10.0 | bal. | 16.1 | bal. | 0.3 | 293 | 91.8 | 7 (chipped) |
| 5 | 15 | — | — | — | 1.0 | bal. | — | 5.4 | 6.3 | bal. | 17.0 | bal. | 0.1 | 307 | 91.8 | 8 (chipped) |

As is clear from the results shown in Table 1, the end mills Nos. 1 to 2 according to the invention have grain sizes of WC falling within a range of 0.5-2 μm, so that they exhibit high toughness and high strength. Therefore, in the cutting test, in spite of the fact that the material to be machined is very hard steel, the end mills according to the invention had neither breakage nor chipping, exhibiting excellent wear resistance. In contrast, the conventional end mills Nos. 1 to 5 have smaller grain sizes of WC falling within a range of 0.5 μm or smaller, so that they exhibit lower toughness and strength. Therefore, in the cutting test, all the conventional end mills Nos. 1 to 5 had their cutting edges chipped, and hence showed relatively short tool lives.

As described heretofore, the end mill formed of WC-base sintered hard alloy according to the present invention has high toughness and high strength by virtue of the binder phase having a composition of 1-15% Cr and not more than 5% W, and WC having a mean grain size of 0.5-2 μm, so that they are free from breakage and chipping even when they are used for cutting very hard steel or cutting by high-speed feed, and also have excellent wear resistance, showing excellent cutting performance over a markedly long period of time.

What is claimed is:

1. An end mill formed of a tungsten carbide-base sintered hard alloy comprising a binder phase including a Co-base alloy, and a hard disperse phase consisting essentially of tungsten-carbide in proportions of:

binder phase: 6-23 wt. %, and
hard disperse phase: 77-94 wt. %,
said binder phase comprising:
Cr: 1-15 wt. %,
W: in an amount not more than 5 wt. %, and
   the balance of Co and inevitable impurities, said hard disperse phase having a mean grain size of 0.5-2 μm.

2. The end mill as claimed in claim 1, wherein said tungsten carbide-base sintered hard alloy comprises said binder phase and said hard disperse phase in proportions of:
binder phase: 8-12 wt. %, and
hard disperse phase: 88-92 wt. %.

3. The end mill as claimed in claim 1, wherein said binder phase contains 5-10 wt. % Cr, and not more than 3 wt. % W.